(12) United States Patent
Karp et al.

(10) Patent No.: US 8,904,176 B2
(45) Date of Patent: Dec. 2, 2014

(54) PROTECTING THE INFORMATION ENCODED IN A BLOOM FILTER USING ENCODED BITS OF DATA

(75) Inventors: Alan H. Karp, Palo Alto, CA (US); Jun Li, Mountain View, CA (US)

(73) Assignee: Hewlett-Packard Development Company, Houston, TX (US)

( * ) Notice: Subject to any disclaimer, the term of this patent is extended or adjusted under 35 U.S.C. 154(b) by 91 days.

(21) Appl. No.: 13/643,661

(22) PCT Filed: Apr. 28, 2010

(86) PCT No.: PCT/US2010/032834
§ 371 (c)(1),
(2), (4) Date: Oct. 26, 2012

(87) PCT Pub. No.: WO2011/136767
PCT Pub. Date: Nov. 3, 2011

(65) Prior Publication Data
US 2013/0046979 A1    Feb. 21, 2013

(51) Int. Cl.
*H04L 9/32* (2006.01)
*G06F 21/34* (2013.01)
*G06Q 20/40* (2012.01)
*H04L 9/00* (2006.01)

(52) U.S. Cl.
CPC ............ *G06F 21/34* (2013.01); *G06Q 20/4093* (2013.01); *H04L 9/3239* (2013.01); *H04L 9/002* (2013.01)
USPC .......................................... 713/168; 705/67

(58) Field of Classification Search
CPC ..... G06F 21/34; H04L 63/14; H04L 63/1441; H04L 9/002
USPC .............................................. 713/168; 705/67
See application file for complete search history.

(56) References Cited

U.S. PATENT DOCUMENTS

| | | | | |
|---|---|---|---|---|
| 4,943,707 | A * | 7/1990 | Boggan ......................... | 235/380 |
| 5,340,967 | A * | 8/1994 | Martin et al. ................. | 235/379 |
| 5,701,464 | A * | 12/1997 | Aucsmith ............................. | 1/1 |
| 7,702,683 | B1 * | 4/2010 | Kirshenbaum ............... | 707/758 |
| 2005/0022009 | A1 | 1/2005 | Aguilera et al. | |
| 2008/0154852 | A1 | 6/2008 | Beyer et al. | |
| 2008/0229103 | A1 | 9/2008 | Mutka et al. | |
| 2008/0256094 | A1 * | 10/2008 | Gupta et al. .................. | 707/100 |
| 2009/0241187 | A1 | 9/2009 | Troyansky | |
| 2010/0174731 | A1 * | 7/2010 | Vermeulen et al. ........... | 707/758 |
| 2010/0284405 | A1 * | 11/2010 | Lim ............................. | 370/392 |

* cited by examiner

*Primary Examiner* — Matthew Smithers

(57) ABSTRACT

Illustrated is a system and method that includes identifying data stored as an entry in a list. The system and method also includes truncating the entry to create a truncated entry. It further includes transforming the truncated entry into a hash, the hash used to set an index position value within a Bloom filter. The system and method also includes an interface module to transmit the Bloom filter.

15 Claims, 14 Drawing Sheets

PROTECTING THE INFORMATION ENCODED IN A BLOOM FILTER USING ENCODED BITS OF DATA

BACKGROUND

Bloom filters are a compact way to construct a list of items and determine with high probability that an item is in the list. However, anyone with access to the Bloom filter can mount a brute force attack to guess items included in the filter. Such an attack is particularly damaging if the filter encodes credit card or other personal information.

BRIEF DESCRIPTION OF THE DRAWINGS

Some embodiments of the invention are described, by way of example, with respect to the following figures.

DETAILED DESCRIPTION

Figure 1:
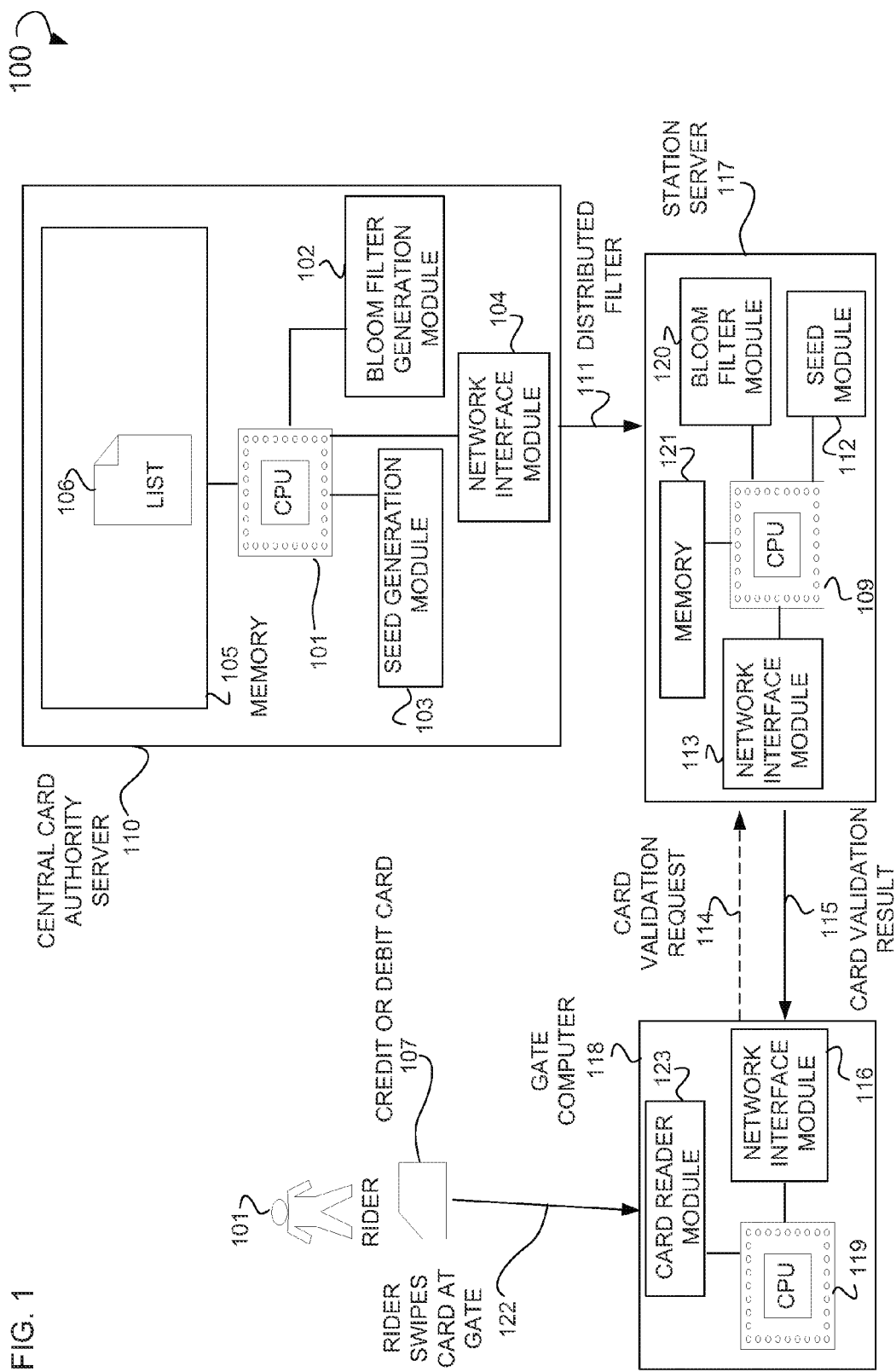
FIG. 1 is a block diagram of a system, according to an example embodiment, used to validate a credit or debit card within a transit system.

Illustrated is a system and method for protecting the data encoded in a Bloom filter from a brute force guessing attack. Bloom filters are commonly used to verify if a test value has been previously encoded in the filter. Someone with access to the Bloom filter can verify guesses until a guess encoded in the filter is found. This successful guess can reveal important information, such as credit or debit card data. The data encoded in the Bloom filter can be protected from such attacks by encoding more than the minimum amount of data. For example, in the credit or debit card context, protection from an attack is provided where all or a portion of the 192 characters encoded on the magnetic strip of a credit or debit card is provided instead of just a credit or debit card account number. For the purpose of illustration only, this Bloom filter may be employed for verifying credit or debit card information used within the context of a transit system.

In one example embodiment, the verification of the credit or debit card used by a rider on the transit system is facilitated through the use of a Bloom filter generated from information stored on the credit or debit card. A Bloom filter, as used herein, is a bit map constructed from one or more hash functions each of which determines an index position to be set to a particular value (e.g., 1) in the bit map. Each index position in the Bloom filter consists of a single bit value that is set to a value different from its initial value as the result of the output of a single hash function, which represents the index position to the bit map. Input for the hash functions is all of the information (e.g. the 192 characters stored on the magnetic strip of a credit or debit card) from a single credit or debit card. In some example cases, redundant information is removed from the input. In some example cases, a counting filter is used. A counting filter is a type of Bloom filter in which the value at each position is the count of the number of times the position is set encoded as multiple bits at the index position.

In a second example embodiment, a hash key value is generated from a portion of the information stored on the credit or debit card. For example, this portion may be some subset of the 192 characters, where the subset has no redundant information. This portion may be preselected so as to ensure that a successful guess does not allow the guessed information to be fraudulently used for purposes other than for its intended use, such as in a transit system. This portion of the stored information may be preselected by a system administrator through the use of a truncation function that truncates the information.

In a third example embodiment, the verification of the credit or debit card used by a rider on the transit system is facilitated through the use of a seed data based Bloom filter. A seed data may a bit value or series of bit values. This seed data is associated with the credit or debit card information and provided as input to the one or more hash functions to generate output in the form of the hash key value, which is used as an index position in the bit map.

As will be discussed in more detail below, the size of the Bloom filter used to implement one or more of the above referenced example embodiments is based upon considerations that include the number of items to be registered, a false hit ratio and the number of hash functions used to achieve this false hit ratio. A false hit ratio, as used herein, is the percentage of false positives related to using a particular Bloom filter. A false positive occurs when data not registered in the filter produces the exactly same set of the index positions as at least one item registered in the Bloom filter.

In some example embodiments, for efficiency reasons, validation of information is done in an unsecured environment or domain. Unsecured, as used, herein, refers to two of more distinct domains, where each domain has a differing levels of trust vis-à-vis another domain. This level of trust is with respect to how each domain securely distributes data in the form of a Bloom filter. For example, while a first domain main use encryption to secure a Bloom filter, a second, unsecured, domain may not use encryption to secure the Bloom filter. Similarly, while a first domain may physically protect a Bloom filter from unauthorized access a second, unsecured, domain may not physically protect a Bloom filter from such unauthorized access. An example of an environment or domain is a computer system.

Given such an environment or domain, it is important that an adversary who obtains an unencrypted copy of the Bloom filter not be able to succeed in using it to determine the data the filter encodes. For example, only the credit card number is needed for a transit payment, but an adversary can guess the 12 unique digits in credit card numbers and find a match in a reasonable time. Including more information, such as cardholder name and expiration date, makes guessing harder. Changing the seed value or values each time the filter is generated limits the chance that if an invalid card is determined to be valid by the validation process with an instance of the Bloom filter, because the Bloom filter introduces false positives, the modified instance of the Bloom filter at next round with different seed value or values, will have a high chance to correctly determine that the invalid card is indeed invalid. Not using all the data (e.g., truncating) means that a successful guess is harder to use in other environments in which the complete data is required.

FIG. 1 is a block diagram of an example system 100 used to validate a credit or debit card within a transit system. Shown is a central card authority server 110 that includes a Central Processing Unit (CPU) 101. Operatively connected to the CPU 101 are a Bloom filter generation module 102, optional seed generation module 103, network interface module 104, and memory 105. As used herein, a module may be implemented in hardware, firmware, or software. The memory 105 may be a persistent or non-persistent memory and includes a list 106. The list 106 may include credit or debit card information formatted as entries within the list 106. In one example embodiment, the CPU 101 retrieves the list 106 from the memory 105. The entries in the list 106 are provided to the Bloom filter generation module 102. As will be illustrated in more detail below, the Bloom filter generation module 102 generates a Bloom filter based upon considerations that include the number of items to be registered, the false hit ratio and the number of hash functions used to achieve this false hit ratio. This Bloom filter is transmitted via the network interface module 104, as a distributed filter 111, to the station server 117. Included as part of this distributed filter 111 are the hash functions, and/or identifier values to identify the hash functions used to generate the distinct hash key value used to index into a position in the Bloom filter and any seed value or values associated with items registered in the Bloom filter.

In some example embodiments, the optional seed data is generated by the seed generation module 103. In one example embodiment, the seed data is associated with the credit or debit card information and stored into memory 105 as part of the list 106. In another example embodiment, the seed data is associated with the Bloom filter. The seed generation module 103 may generate the seed data on an as needed basis in response to a request by the CPU 101. The seed generation module 103 may be a random number generator, a current date generator, a counter, a timer, a clock, or some other module to generate numeric values. The value generated by the seed generation module 103 may be a bit value, integer value, alpha-numeric value, or some other suitable value. This seed data may be provided to the station server 117 as part of the distribution filter 111 to be stored into the seed module 112.

Illustrated is the station server 117 used to process card validation requests submitted by one or more gate computer(s). The station server 117 may be located proximate to a gate computer 118 and related to a physical gate. The station server 117 includes a CPU 109 operatively connected to a memory 121, Bloom filter module 120, optional seed module 112, and network interface module 113. Using the network interface module 113, the distributed filter 111 is received by the station server 117. The memory 121 may be persistent or non-persistent memory into which is stored the distributed filter 111.

In some example embodiments, the station server 117 receives the card validation request 114 that includes credit or debit card information. The card validation request 114 is received by the network interface module 113, and provided to the Bloom filter module 120. The credit or debit card information is passed through one or more hash functions and the output (i.e., a distinct hash key value) of the one or more hash functions used to index into the Bloom filter. In cases where all computed index position values are found to differ from their initial value or values, the credit or debit card information is deemed to be valid. The Bloom filter module 120 sends the results of the validation to the CPU 109 which uses the network interface module 113 to transmit the card validation result 115 to the gate computer 118. In cases where the optional seed data is used in validation, the seed module 112 is used to associate the seed data with the credit or debit card information from the card validation request 114. This seed data and credit or debit card information is passed through the one or more hash functions as discussed above. In some example embodiments, the seed data is associated with the Bloom filter and accessed as a bit value within in the Bloom filter.

In some example embodiments, the gate computer 116 receives the card validation result 115 in response to a rider 101 swiping a card 107 at a gate as reflected at 122. Included as part of the gate computer 118 is a CPU 119 that is operatively connected to a card reader module 123, and network interface module 116. In one example embodiment, the credit or debit card information is read by the card reader module 123. The information is passed to the network interface module 116 by the CPU 119. The network interface module 116 formats the credit or debit card information for transmission to the station server 117. This credit or debit card information is transmitted as a card validation request 114. In cases where a card validation result 115 is received by the gate computer 118 that authorizes access by the rider 101 to a transportation mode (e.g., train, bus, airplane, or automobile) a signal is sent to the physical gate operatively connected to the gate computer 118 to allow the rider 101 access to the transportation mode.

In some example embodiments, the distributed filter 111 on the station server 117 is unsecured. Specifically, the station server 117 may not include encryption protection for the data encoded in the distributed filter 111, and may rely on the amount of data encoded in the filter as a way to protect the data represented in the distributed filter 111. Encrypted data has a high overhead cost associated with it, where such data must be decrypted/encrypted during each use. Through not using encryption protections for the distributed filter 111, the card validation request 114 can be processed faster as compared to implementations where the distributed filter 111 (i.e., the Bloom filter) is encrypted. On the other hand, the use of a different seed data every time when the Bloom filter is generated avoids the repetitive incorrect validation of the invalid data due to Bloom filter's unavoidable false positives.

Figure 2:
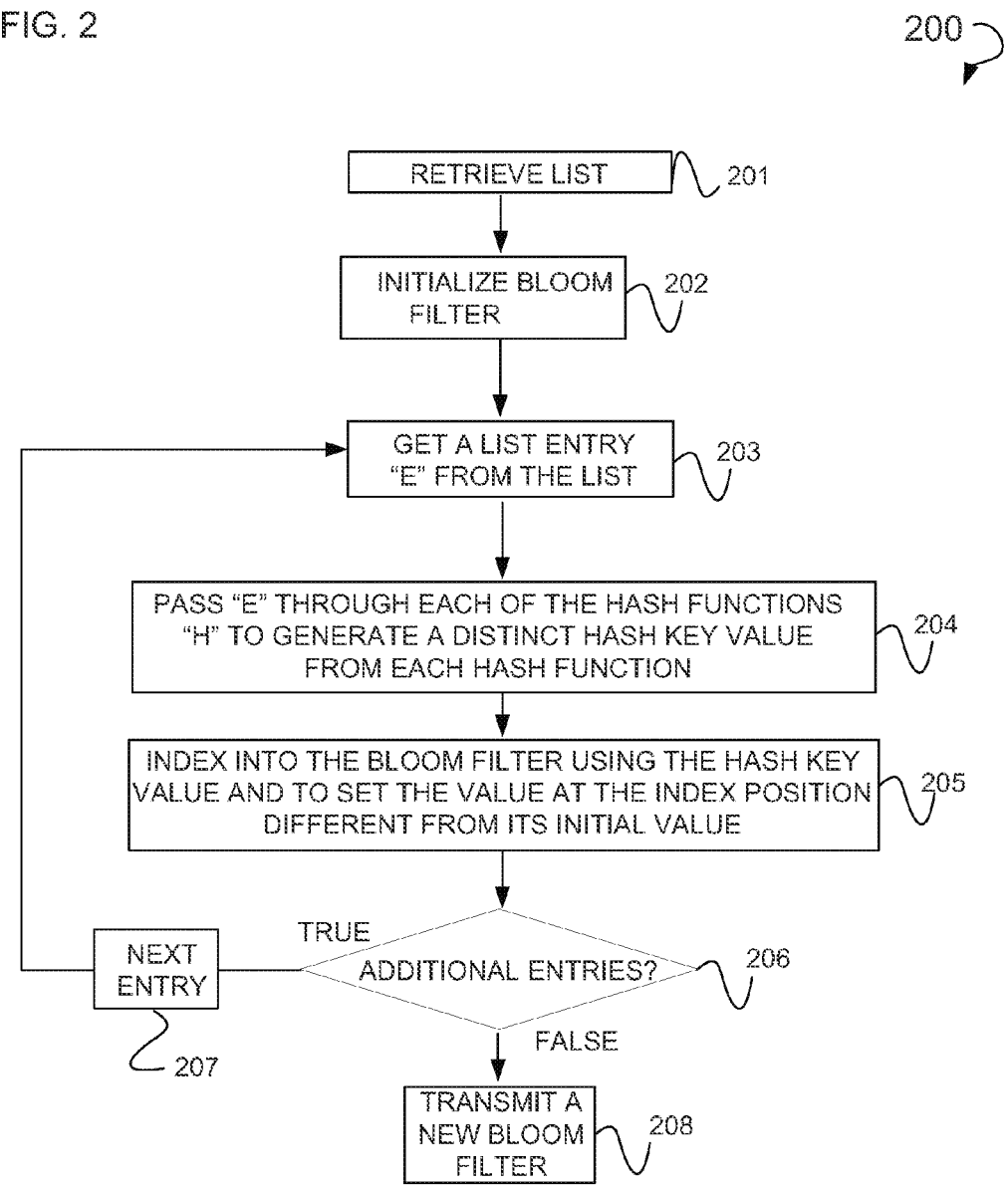
FIG. 2 is a flow chart illustrating a method, according to an example embodiment, to generate a Bloom filter.

FIG. 2 is a flow chart illustrating an example method 200 to generate a Bloom filter. This method 200 may be executed by the central credit card authority server 110. Shown are operations 201-208 that may be executed by the Bloom filter generation module 102. Operation 201 is executed to retrieve a list of information. The list may be the list 106 stored in the memory 105. Operation 202 is executed to initialize a Bloom filter by setting all the index position values (i.e., the bits) to "0." Operation 203 is executed to get a list entry "E" from the list 106. Operation 204 is executed to pass "E" through at least one hash function "H" to generate at least one distinct hash function key value from the at least one hash function. In some example embodiments, the optional seed data is associated with the entry "E" passed through the at least one hash function "H." Operation 205 is executed to index into the Bloom filter using the hash key value and to set the value at the index position different from its initial value. Decision operation 206 is executed to determine whether additional entries "E" exist in the list 106. In cases where decision operation 206 evaluates to "true," operation 207 is executed to move to the next entry in the list 106, and operation 203 is re-executed. In cases where decision operation 206 evaluates to "false," operation 208 is executed to transmit the new Bloom filter as the distributed filter 111.

In some example embodiments, method 200 is executed by the central authority server 110 on a periodic basis, or when an event occurs. An event may be the registration of new credit or debit card information for use within a system that uses the Bloom filter, the removal of credit or debit card information from the system, the detection of a fraudulent use of registered credit or debit card information within the system, or some other suitable event. Further, each time the method 200 is executed each of the hash functions "H" may be different from the previous hash functions "H" used in generating the Bloom filter. Further, optional seed data, different than the previously used optional seed data, may also be associated with "E" to generate the Bloom filter.

Figure 3:
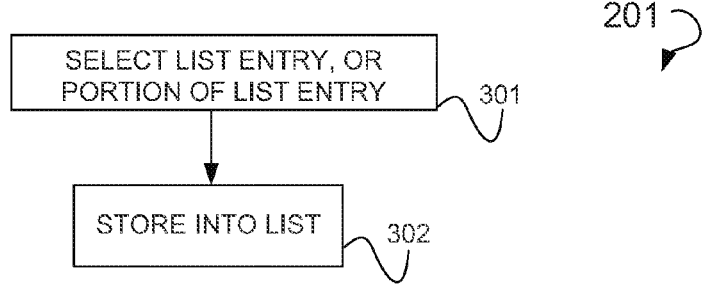
FIG. 3 is a flow chart illustrating an execution of an operation, according to an example embodiment, to select an entry, or portion of an entry, in a list.

FIG. 3 is a flow chart illustrating an example execution of operation 301 to select an entry, or portion of an entry, in a list. Shown is an operation 301 that is executed to select an entry, or portion of an entry, in a list. This portion may be some number of characters less than all the characters in the item to be entered into the list. The portion may be identified through the use of a function that truncates the entry based upon some predetermined value. For example, a portion of an entry may be some number of characters less than the 192 characters stored on the magnetic strip of a credit or debit card. Operation 302 is executed to store a portion of an entry into the list.

Figure 4:
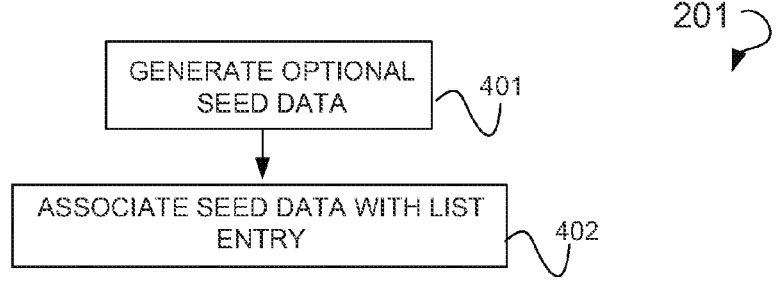
FIG. 4 is a flow chart illustrating an execution of an operation, according to an example embodiment, to optionally generate and associate seed data with a list entry.

FIG. 4 is a flow chart illustrating an example execution of an operation 301 to optionally generate and associate seed data with a list entry. Operation 401 is executed to generate optional seed data. This seed data may be a bit value or series of bit values. Operation 402 is executed to associate the seed data with a list entry. In some example embodiments, different seed data is associated with each entry in the list. In some example embodiments, the same seed data is associated with each entry in the list. In the case of different seed data being used, the operation 401 may be executed to generate a new, different seed data each time a list entry "E" is retrieved. Associate, as used herein, includes prepending, appending, concatenating, or otherwise combing the seed data and a list entry or portion thereof.

Figure 5:
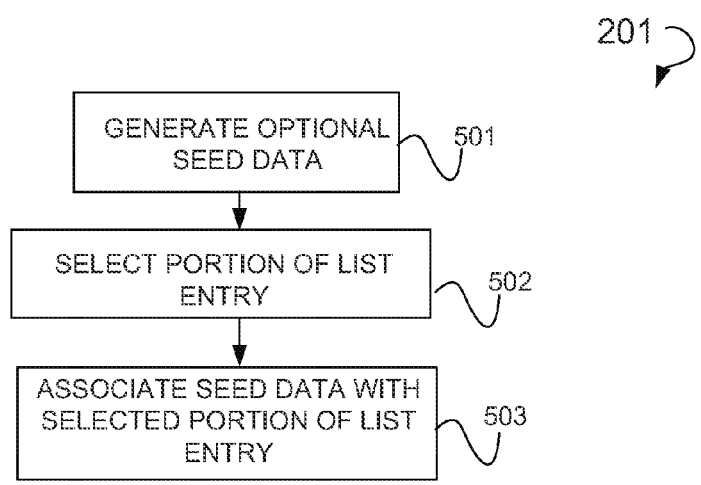
FIG. 5 is a flow chart illustrating an execution of an operation, according to an example embodiment, to optionally generate and associate seed data with a portion of the list entry.

FIG. 5 is a flow chart illustrating an example execution of an operation 501 to optionally generate and associate seed data with a portion of the list entry. Operation 501 is executed, to generate optional seed data. Operation 502 is executed to select a portion of the list entry. Operation 503 is executed to associate the seed data with a selected portion of the list entry. This portion may be determined through the use of a function that truncates the list entry based upon some predetermined value.

Figure 6:
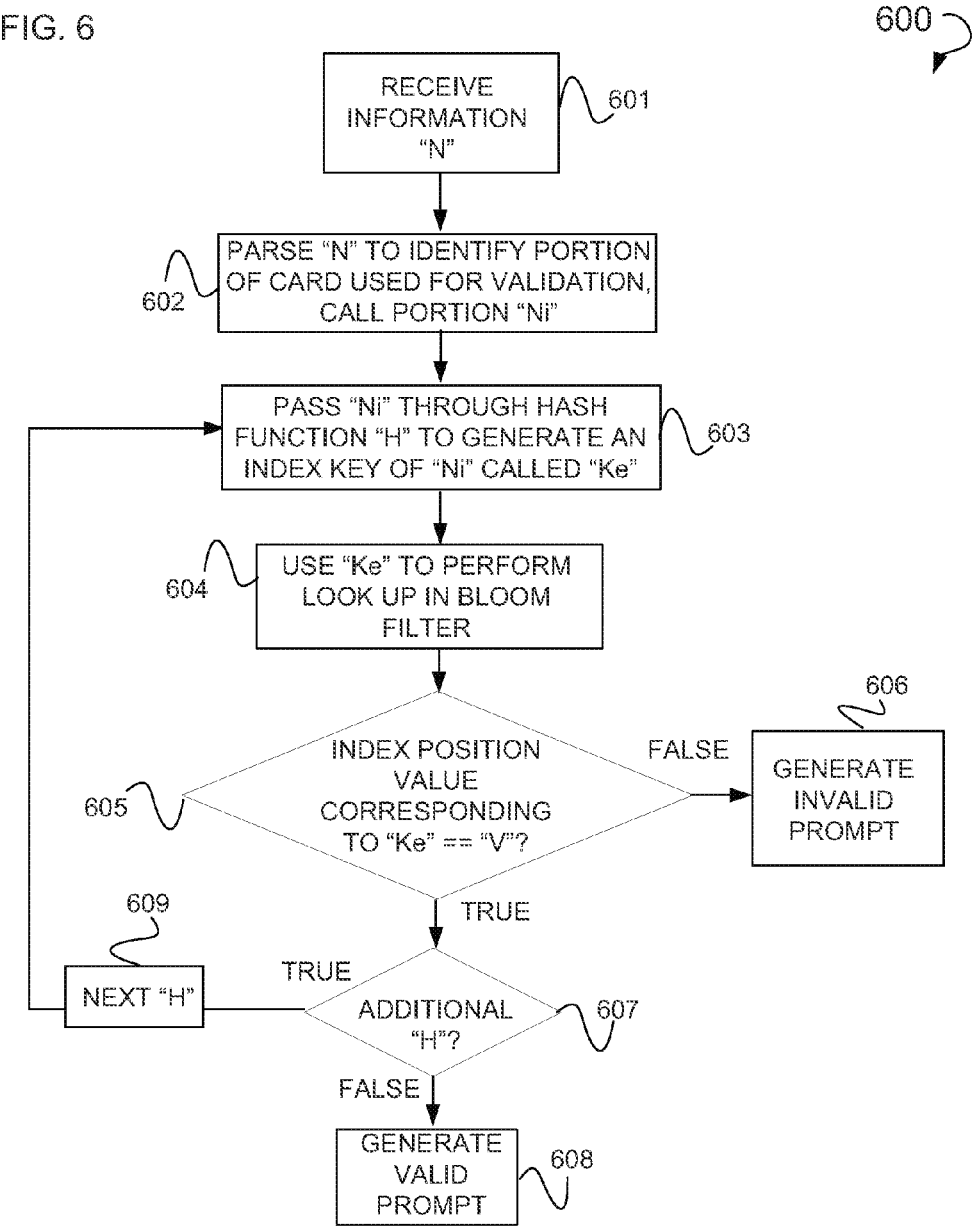
FIG. 6 is a flow chart illustrating an execution of method, according to an example embodiment, used to process a validation request.

FIG. 6 is a flow chart illustrating an example execution of method 600 used to process a validation request. This method 600 may be executed by the Bloom filter module 120. Operation 601 is executed to receive information "N" that is part of a validation request. The request may be the card validation request 114. Operation 602 is executed to parse "N" to identify the portion of the information, referred as "Ni," used for validation. In some example cases, the complete value of "N" is used to generate the "Ni" value used for validation. Further, "N" may be the 192 characters stored on a credit or debit card magnetic strip, whereas "Ni" may be a portion of these 192 characters. Operation 603 is executed to pass "Ni" through a hash function "H" to generate an index key of "Ni" called "Ke." Operation 604 is executed to use "Ke" to perform a lookup in the Bloom filter, a Bloom filter such as the distributed filter 111. Decision operation 605 is executed to determine whether "Ke" corresponds to, or maps to an index position having a different value (e.g., "V") as compared to an initial value. This decision operation 605 may be executed by the CPU 209. In cases where decision operation 605 evaluates to "false," operation 606 is executed. In cases where decision operation 605 evaluates to "true," a further decision operation 607 is executed. Operation 606 is executed to generate an invalid prompt, denoting that "Ke" is mapped to an index position value that denotes an invalid value. Decision operation 607 is executed to determine whether an additional "H" exists through which the "Ni" value is to be passed. In cases where decision operation 607 evaluates to "true," operation 609 is executed. In cases where decision operation 607 evaluates to "false," operation 608 is executed. Operation 609 is executed to move to the next hash function "H" that is to receive "Ni." Operation 608 is executed to generate a valid prompt, denoting a valid "N."

Figure 7:
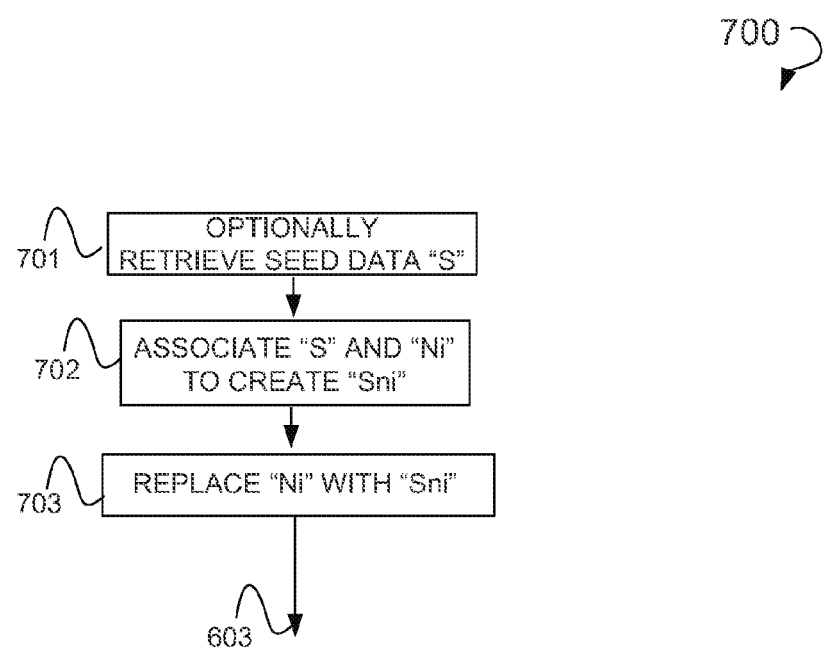
FIG. 7 is a flow chart illustrating a method, according to an example embodiment, executed to associate seed data with the received information relating to a validation request.

FIG. 7 is a flow chart illustrating an example method 700 executed to associate seed data with the received information relating to a validation request. This method 700 may be executed by the seed module 112, and may be interposed between the execution of operations 602 and 603. Shown is an operation 701 that is executed to optionally retrieve seed data "S." Operation 702 is executed to associate "S" and "Ni" to create "SNi." Operation 703 is executed to replace "Ni" with "SNi."

Figure 8:
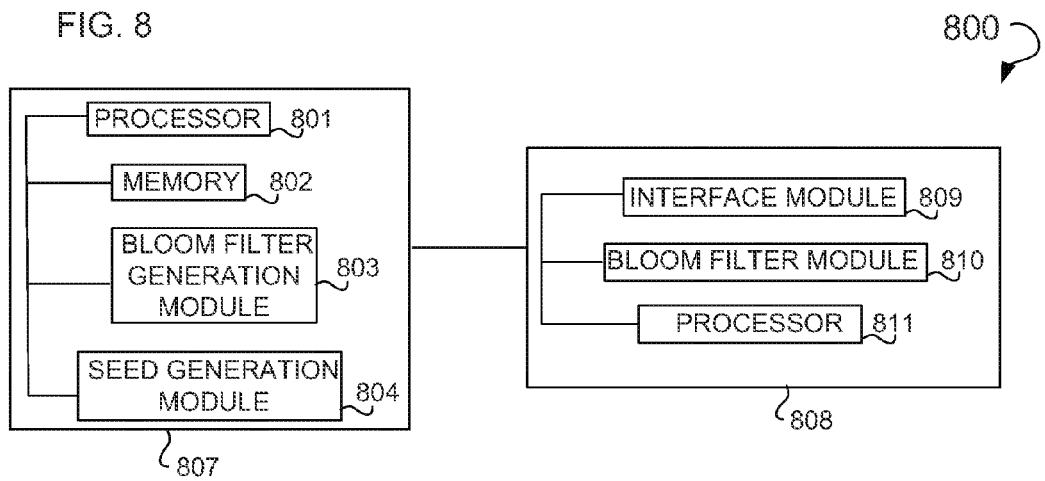
FIG. 8 is a block diagram, according to an example embodiment, illustrating a system used to build a Bloom filter that associates seed data with an entry from a list.

FIG. 8 is a block diagram, according to an example embodiment, illustrating a system 800 used to build a Bloom filter that associates seed data with an entry from a list. These various blocks may be implemented in hardware, firmware, or software. An example of this system 800 is the system 100. The processor 801, memory 802, Bloom filter generation module 803, and seed generation module 804 reside on a secured apparatus 807 that is part of the system 100. An example of the secured apparatus 807 is the central card authority server 110, Operatively connected, as used herein, means logically or physically connected. Illustrated is a processor 801 operatively connected to a memory 802 that includes data stored as at least one entry of encoded information in a list (e.g., the list 106). Operatively connected to the processor 801 is the Bloom filter generation module 803, that resides on the secured apparatus 807, to build a Bloom filter based upon the at least one entry, the Bloom filter to include at least one index position value that is set based upon a hash of the at least one entry. In some example embodiments, a plurality of entries are passed to a plurality (i.e., a set) of hash functions that are used to generate a plurality of hashes, each hash of the plurality of hashes used to set a distinct index position value in the Bloom filter. Operatively connected to the processor 801 is the seed generation module 804, that resides on the secured apparatus 807, to generate seed data to be associated with the at least one entry of encoded information. Also shown, as part of the system 100, is an unsecured apparatus 808 that includes an interface module 809, Bloom filter module 810, and processor 811. An example of the unsecured apparatus 808 is the station server 117. Operatively connected to the secured apparatus 807 is the interface module 809 to receive a validation request that includes the at least one entry of encoded information. Operatively connected to the interface module 809 is the Bloom filter module 810 to validate the associated seed data and the at least one entry of encoded information against the Bloom filter. In some example embodiments, the unsecured apparatus 808 is located remotely from the secured apparatus 807. In some example embodiments, the seed generation module 804 generates different seed data to be associated with the at least one entry and an additional entry of encoded information in the list each time a different Bloom filter is generated. In some example embodiments, the seed generation module 804 generates seed data to be associated with the at least one entry, and different additional seed data to be associated with an additional entry in the list, each time a different Bloom filter is generated. In some example embodiments, the Bloom filter generation 803 module builds a different Bloom filter based upon a portion of the at least one entry. In some example embodiments, the Bloom filter generation module 803 builds a different Bloom filter, through the use of a different set of hash functions, each time a different Bloom filter is generated by the Bloom filter generation module.

Figure 9:
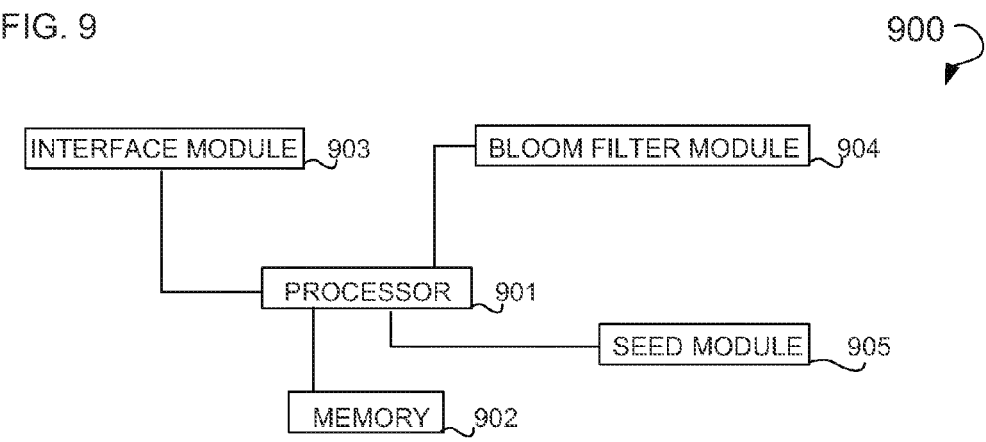
FIG. 9 is a block diagram, according to an example embodiment, illustrating a system used to validate data using a Bloom filter.

FIG. 9 is a block diagram, according to an example embodiment, illustrating a system 900 used to validate data using a Bloom filter. These various blocks may be implemented in hardware, firmware, or software. An example of this system 900 is the station server 117. This system 900 may be unsecured. Illustrated is a processor 901 operatively connected to a memory 902. Operatively connected to the processor 901 is an interface module 903 to receive a validation request, from a secured apparatus, the validation request to include data as encoded information. Operatively connected to the processor 901 is a Bloom filter module 904 to generate a hash of the encoded information where the encoded information is passed to a hash function that resides as part of the Bloom filter module 904. In some example embodiments, the encoded information is passed through a plurality (i.e., a set) of distinct hash functions. In some example embodiments, the processor 901 validates the encoded information through a comparison of the hash to an index position value within a Bloom filter. In some example embodiments, the interface module transmits an invalidation result, the invalidation result transmitted where the hash maps to an index position value that denotes an invalid value. Operatively connected to the processor 901 is a seed module 905 to store seed data to be associated with the encoded information. In some example embodiments, seed module 905 stores seed data to be associated with the Bloom filter each time a different Bloom filter is generated. In some example embodiments, the seed data includes at least one of a bit value, an integer value, or an alpha-numeric value. In some example embodiments, the Bloom filter module uses a different hash function each time an additional Bloom filter is received by the unsecured apparatus.

Figure 10:
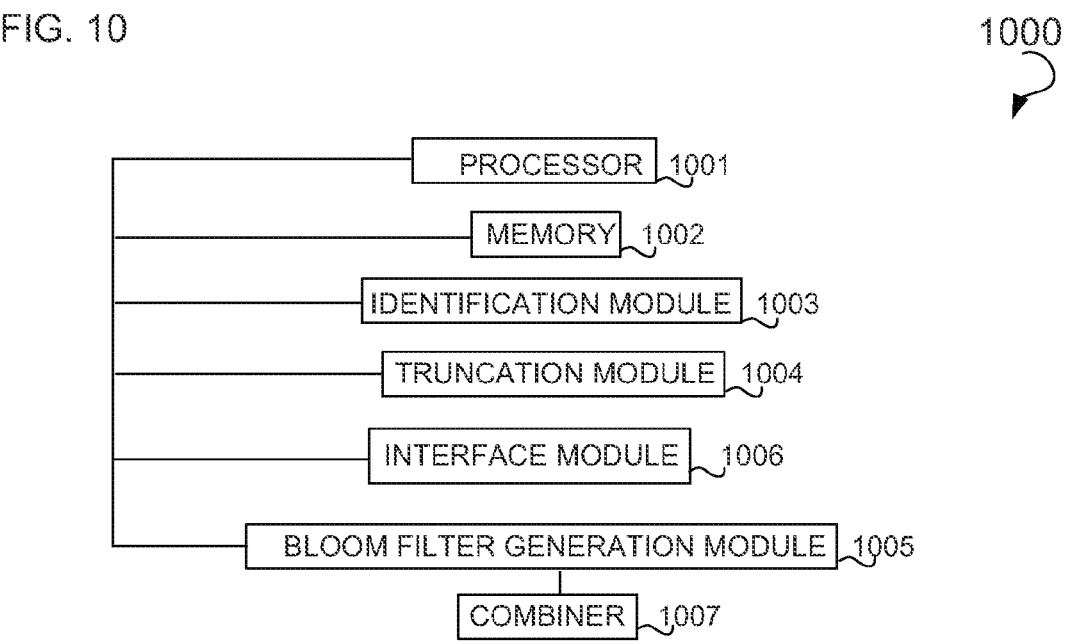
FIG. 10 is a block diagram, according to an example embodiment, illustrating a system used to validate truncated, data using a Bloom filter.

FIG. 10 is a block diagram, according to an example embodiment, illustrating a system 1000 used to validate truncated data using a Bloom filter. These various blocks may be implemented in hardware, firmware, or software. An example of this system 1000 is the central card authority server 110. Shown is a processor 1001 and a memory 1002 operatively connected to the processor 1001. An identification module 1003 is operatively connected to the processor 1001 to identify data stored as an entry in a list. A truncation module 1004 is operatively connected to the processor 1001 to truncate the entry to create a truncated entry. A Bloom filter generation module 1005 is operatively connected to the processor 1001 to transform the truncated entry into a hash, the hash used to set an index position value within a Bloom filter. In some example embodiments, one or more of the truncated entries are passed through one or more distinct hash functions (i.e., a set of hash functions), that are part of the Bloom filter generation module 1005, to generate one or more hashes each of which is used to set a distinct index position value within the Bloom filter. An interface module 1006 is operatively connected to the processor 1001 to transmit the Bloom filter. In some example embodiments, the Bloom filter generation module 1005 transforms the truncated entry into a different hash, the different hash used to set a different index position value within the Bloom filter. A combiner 1007 operatively connected to the Bloom filter generation module 1005 associates the seed data and the truncated entry. In some example embodiments, the Bloom filter generation module 1005 transforms the associated seed data and truncated entry into a different hash, the different hash used to set a different index position value within a different Bloom filter.

Figure 11:
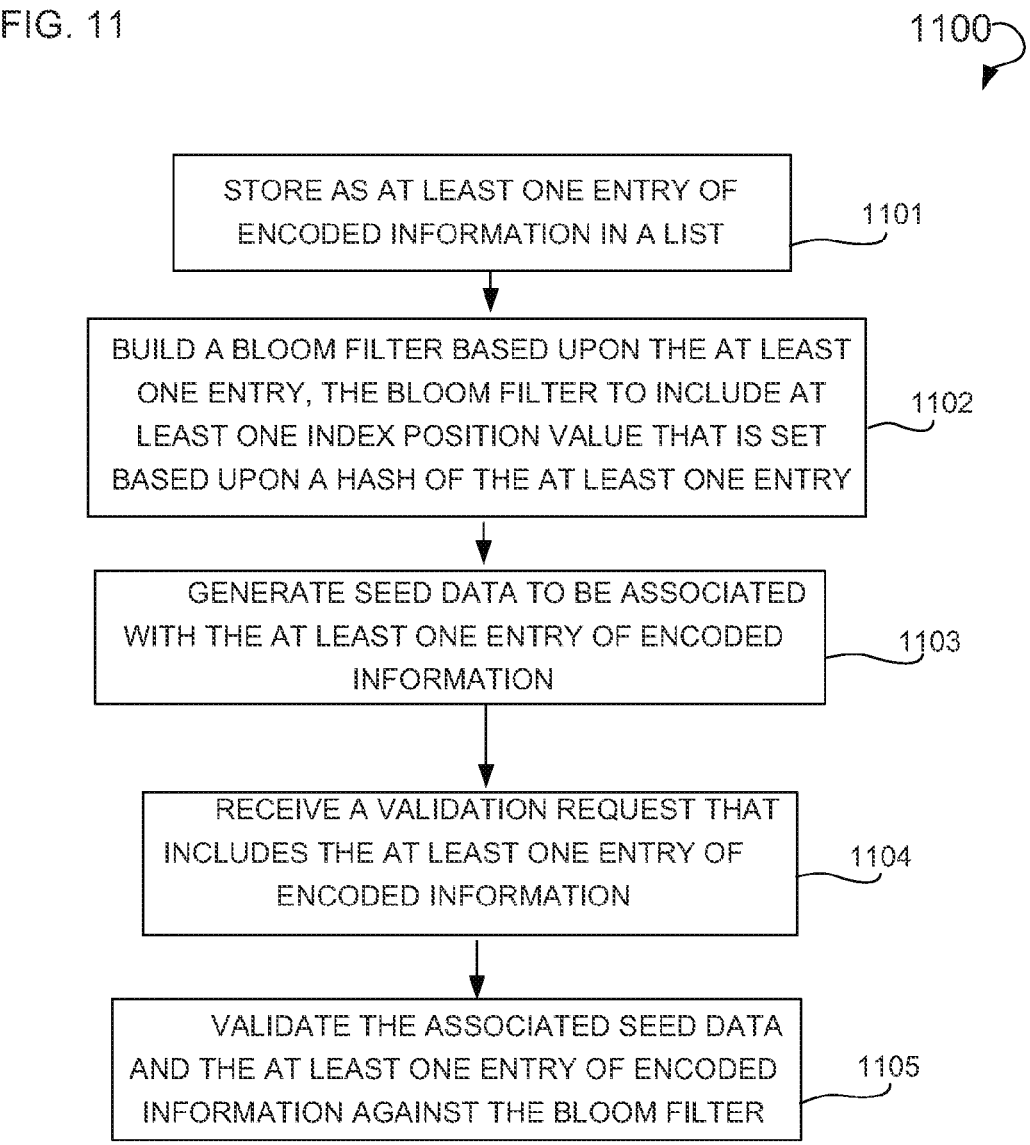
FIG. 11 is a flow chart illustrating the execution of a method, according to an example embodiment, to build a Bloom filter that associates seed data with an entry from a list.

FIG. 11 is a flow chart illustrating the execution of an example method 1100 executed to build a Bloom filter that associates seed data with an entry from a list. This method 1100 may be executed as part of the system 100 and the apparatus illustrated therein. Specifically, operations 1101-1103 may be executed by a secured device such as the central card authority server 110. Operation 1104-1105 may be executed by an unsecured device such as the station server 117. Operation 1101 is executed by the processor 801 to store data into the memory 802 as at least one entry of encoded information in a list. Operation 1102 is executed by the Bloom filter generation module 803 to build a Bloom filter based upon the at least one entry, the Bloom filter to include at least one index position value that is set based upon a hash of the at least one entry. In some example embodiments, a set of distinct hash functions is used to generate a plurality of hashes each of which is used to set a distinct index position value in the Bloom filter. Operation 1103 is executed by the seed generation module 804 to generate seed data to be associated with the at least one entry of encoded information. Operation 1104 is executed by the interface module 809 to receive a validation request that includes the at least one entry of encoded information. Operation 1105 is executed by the Bloom filter module 810 to validate the associated seed data and the at least one entry of encoded information against the Bloom filter. In some example embodiments, the unsecured apparatus is located remotely from the secured apparatus. In some example embodiments, the seed generation module 804 generates different seed data to be associated with the at least one entry and an additional entry of encoded information in the list each time a different Bloom filter is generated. In some example embodiments, the seed generation module 804 generates seed data to be associated with the at least one entry, and different additional seed data to be associated with an additional entry in the list, each time a different Bloom filter is generated. In some example embodiments, the Bloom filter generation module 803 builds a different Bloom filter based upon a portion of the at least one entry. In some example embodiments, the Bloom filter generation module 803 builds a different Bloom filter, through the use of a different set of hash functions, each time a different Bloom filter is generated by the Bloom filter generation module.

Figure 12:
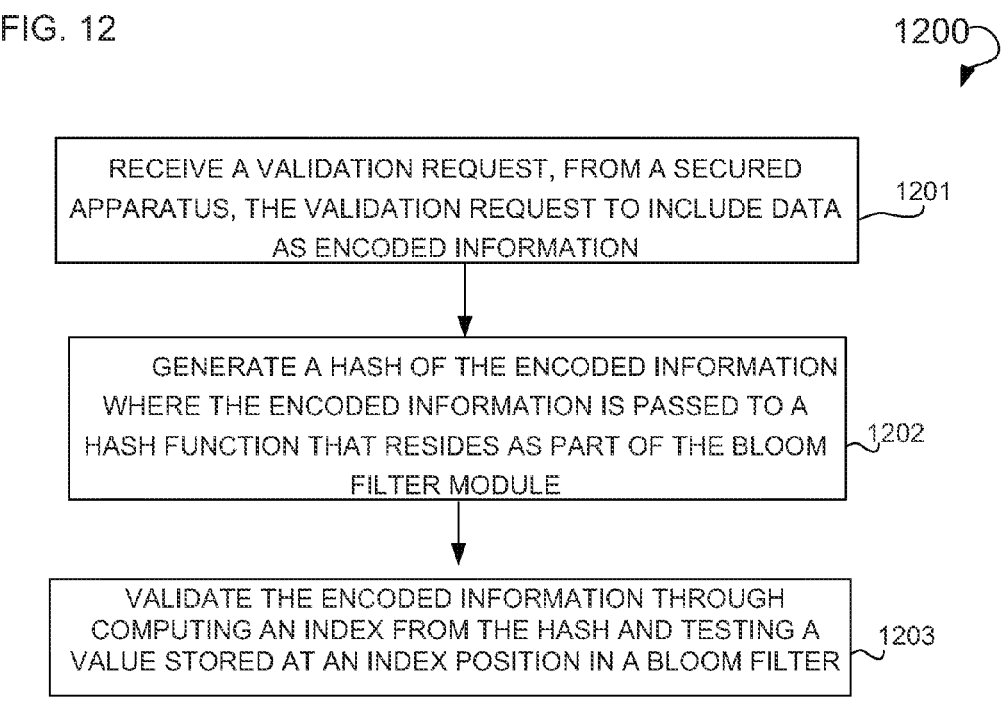
FIG. 12 is a flow chart illustrating a method, according to an example embodiment, used to validate data using a Bloom filter.

FIG. 12 is a flow chart illustrating an example method 1200 used to validate data using a Bloom filter. This method 1200 may be executed by an unsecured apparatus such as the station server 117. Operation 1201 is executed by the interface module 903 to receive a validation request, from a secured apparatus, the validation request to include data as encoded information. An example of a secured apparatus is the card authorization server 110. Operation 1202 is executed by the Bloom filter module 904 to generate a hash of the encoded information where the encoded information is passed to a hash function that resides as part of the Bloom filter module 904. In some example embodiments, a plurality of entries are passed to a plurality (i.e., a set) of hash functions that are used to generate a plurality of hashes, each hash of the plurality of hashes used to set a distinct index position value in the Bloom filter. In some example embodiments, an operation 1203 is executed by the processor 901 to validate the encoded information through computing an index from the hash and testing a value stored at an index position in a Bloom filter.

In some example embodiments, an optional operation is executed by the interface module 903 to transmit an invalidation result, the invalidation result transmitted where the hash maps to an index position value that denotes an invalid value. Further, an optional operation is executed by the seed module 905 to store seed data to be associated with the encoded information. In some alternative example embodiments, this optional operation is executed by the seed module 905 to store seed data to be associated with the Bloom filter each time a different Bloom filter is generated. In some example embodiments, the seed data includes at least one of a bit value, an integer value, or an alpha-numeric value. An optional operation is executed by the Bloom filter module 904 to uses a different hash function each time an additional Bloom filter is received by the unsecured apparatus.

Figure 13:
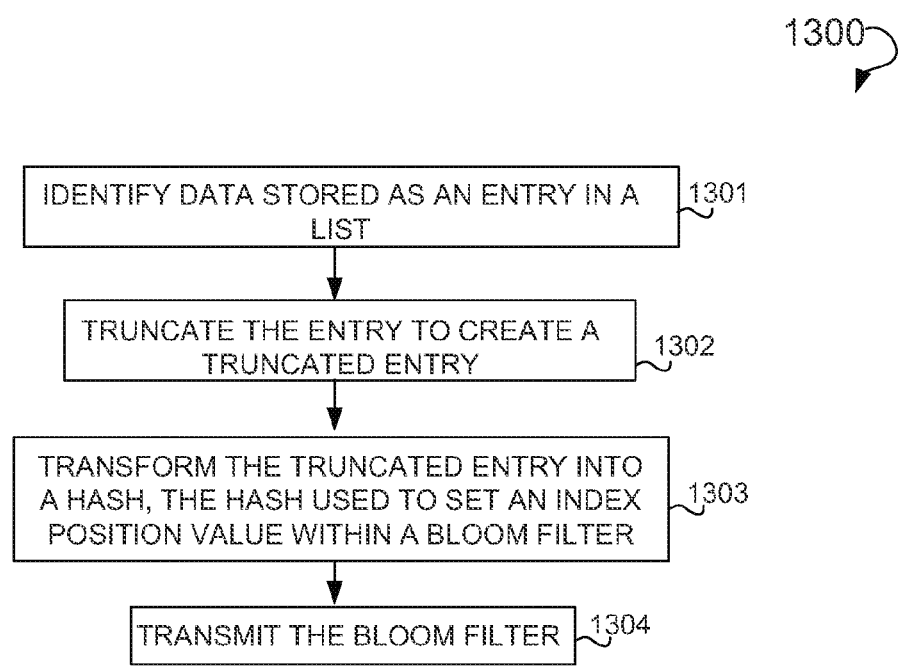
FIG. 13 is a flow chat illustrating a method, according to an example embodiment, executed to validate truncated data using a Bloom filter.

FIG. 13 is a flow chat illustrating an example method 1300 executed to validate truncated data using a Bloom filter. This method 1300 may be executed by the central card authority server 110, or other suitable computer system. Operation 1301 is executed by the identification module 1003 to identity data stored as an entry in a list. Operation 1302 is executed by the truncation module 1004 to truncate the entry to create a truncated entry. Operation 1303 is executed by the Bloom filter generation module 1005 to transform the truncated entry into a hash, the hash used to set an index position value within a Bloom filter. In some example embodiments, one or more of the truncated entries are passed through one or more distinct hash functions (i.e., a set of hash functions), that are part of the Bloom filter generation module 1005, to generate one or more hashes each of which is used to set a distinct index position value within the Bloom filter. Operation 1304 is executed by the interface module 1006 to transmit the Bloom filter. In some example embodiments, operation 1303 is executed to transform the truncated entry into a different hash, the different hash used to set a different index position value within the Bloom filter. In some example embodiments, an operation is optionally executed after the operation 1302, by the combiner 1007, to associate seed data and the truncated entry. In some example embodiments, an operation is optionally executed after the operation 1302, by the Bloom filter generation module 1005, to transform the associated seed data and truncated entry into a different hash, the different hash used to set a different index position value within a different Bloom filter.

Figure 14:
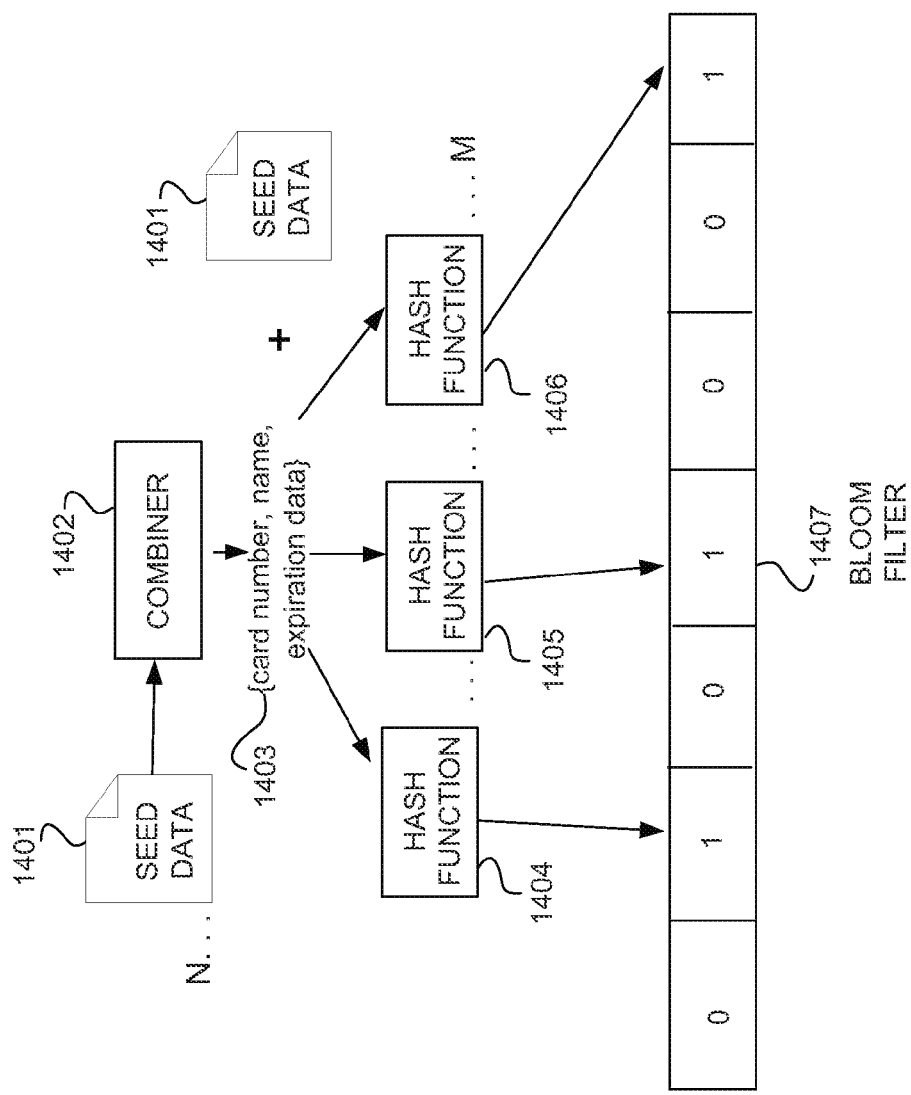
FIG. 14 is a diagram, according to an example embodiment, illustrating the building of a Bloom filter using a Bloom filter generation module that associates the same seed data with each entry from a list.

FIG. 14 is a diagram 1400, according to an example embodiment, illustrating the building of a Bloom filter using a Bloom filter generation module 102 that associates the same seed data with each entry from a list. Shown is a combiner 1402 that retrieves an entry from the list 106. This entry may be the 192 characters, or some portion of these characters, related to a credit or debit card. As illustrated at 1403, this entry may include information such as a card number, card holder name, and expiration date. Optional seed data 1401, provided by the seed generation module 203, is associated with the entry 1403. Associated includes the previously illustrated prepending, appending, concatenating, or otherwise combing the seed data and the entry 1403. The same optional seed data 1401 is associated with each entry 1403 from the list 106, where the entry 1403 is retrieved from the list 106. The entry 1403 and the optional seed data 1401 are passed as input to each of the hash functions 1404-1406. Based upon the target false positive probability value, the appropriate number of hash functions and Bloom filter size for a given number of items to be encoded may be determined. A distinct hash key value is generated as output by each of the hash functions. Each of these distinct hash key values is used to set a distinct index position within the Bloom filter 1407 to a valid value different from its initial value (e.g., "V").

Figure 15:
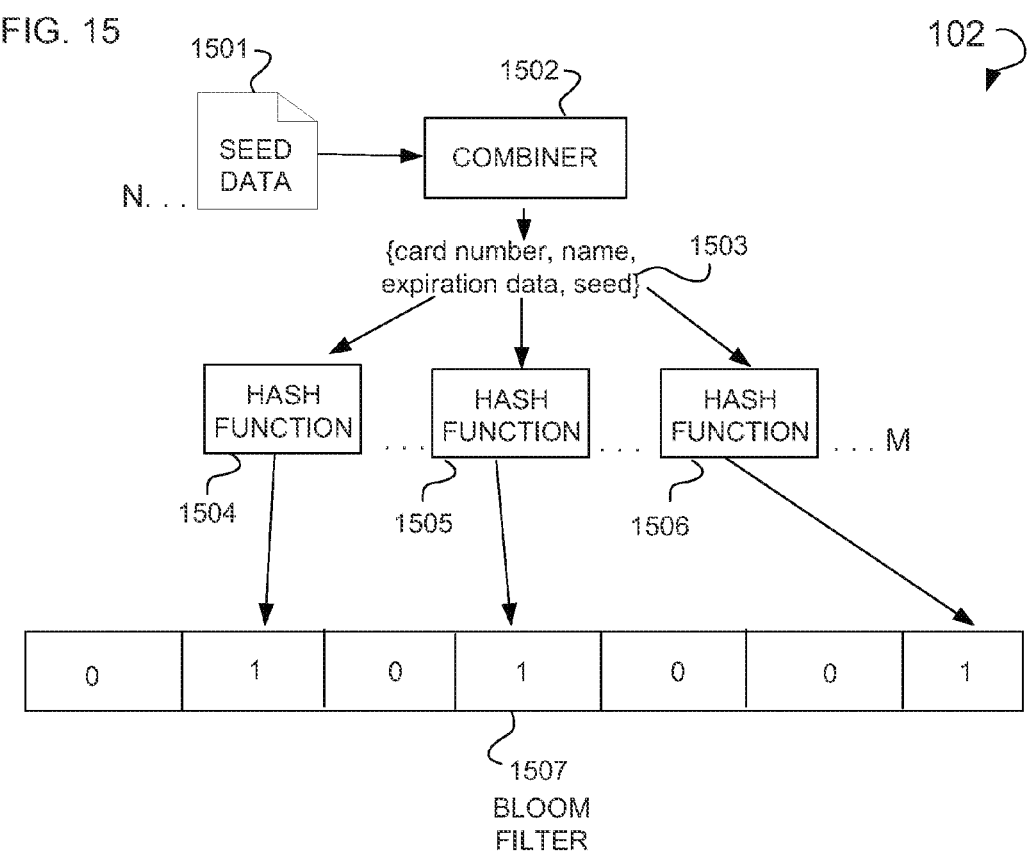
FIG. 15 is a diagram, according to an example embodiment, illustrating the building of a Bloom filter using a Bloom filter generation module that associates the different seed data with each entry from a list.

FIG. 15 is a diagram 1500, according to an example embodiment, illustrating the building of a Bloom filter using a Bloom filter generation module 102 that associates the different seed data with each entry from a list. Shown is a combiner 1502 that retrieves an entry 1503 from the list 106. This entry 1503 may be the 192 characters, or some portion of these characters, related to a credit or debit card. Additionally, this entry 1503 may include information such as a card number, card holder name, expiration data and optionally seed data 1501 provided by the seed generation module 103. A different optional seed data 1501 is associated with each entry 1503. The entry 1503 is passed as input to each of the hash functions 1504-1506. The determination of the appropriate number of hash functions is based upon considerations including a target false positive probability value. Based upon the target false positive probability value, the appropriate number of hash functions and Bloom filter size for a given number of items to be encoded may be determined. A distinct hash key value is generated as output by each of the hash functions. Each of these distinct hash key values is used to set a distinct index position within the Bloom filter 1507 to a valid value different from its initial value (e.g., "V").

Figure 16:
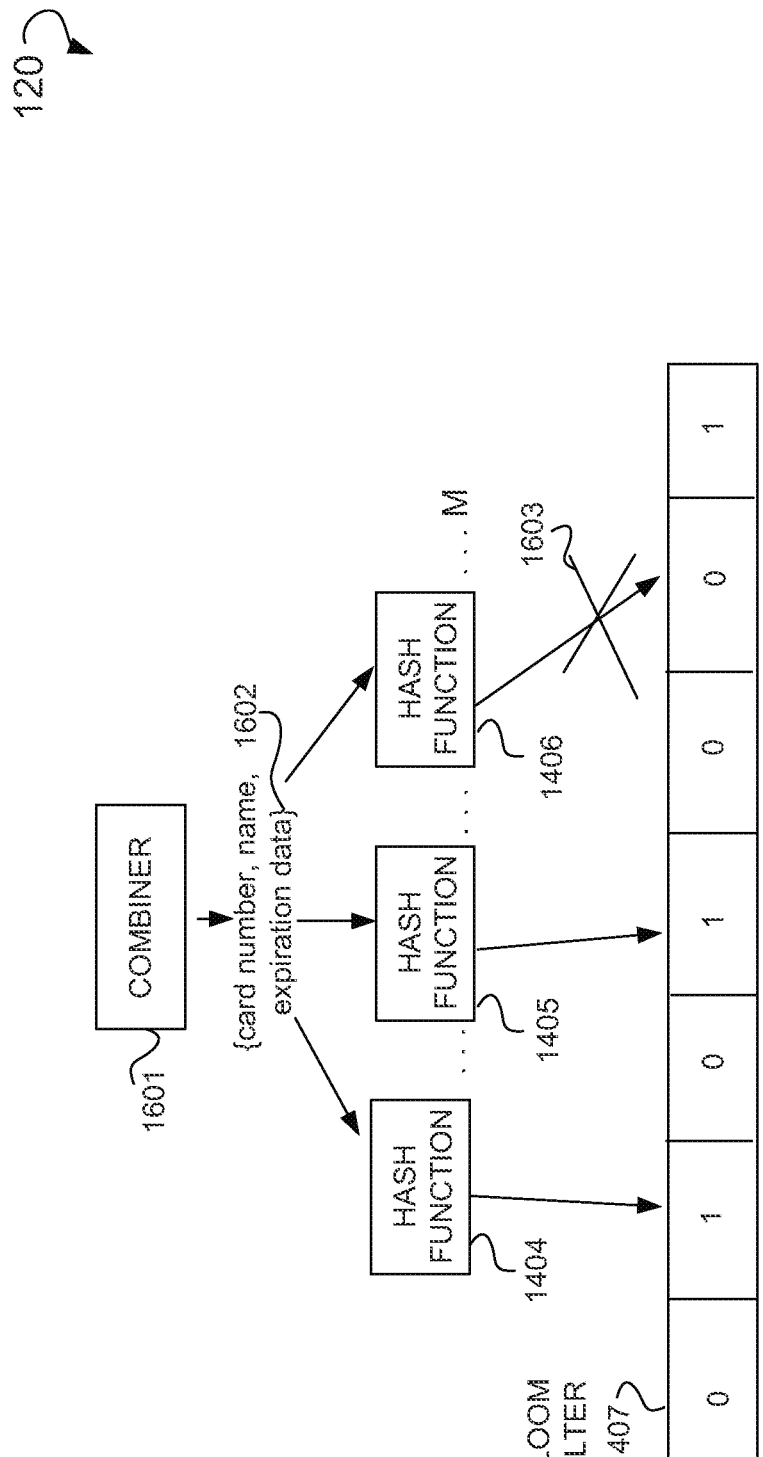
FIG. 16 is a diagram, according to an example embodiment, showing a lookup operation performed by the Bloom filter module and the invalidation of a data validation request.

FIG. 16 is a diagram 1600, according to an example embodiment, showing a lookup operation performed by the Bloom filter module 120 and the invalidation of a data validation request. Illustrated is a combiner 1601 that receives a data validation request. An example of a data validation request is a card validation request 114 that includes certain information to be validated. As shown at 1602 this information may be a card number, name, expiration data. Optional seed data 1401 or 1501 may be part of this information. The information shown at 1602 is provided separately as input to each of the hash functions 1404-1406, or 1504-1506 (not illustrated). Each of these hash functions 1404-1406 outputs a distinct hash key value that is used to index into the Bloom filter 1407 or 1507 (not illustrated). As shown at 1603, where the hash key value indexes to an index position value that denotes an invalid value (that is, the initial value), the information is invalid and the operation 606 may be executed.

Figure 17:
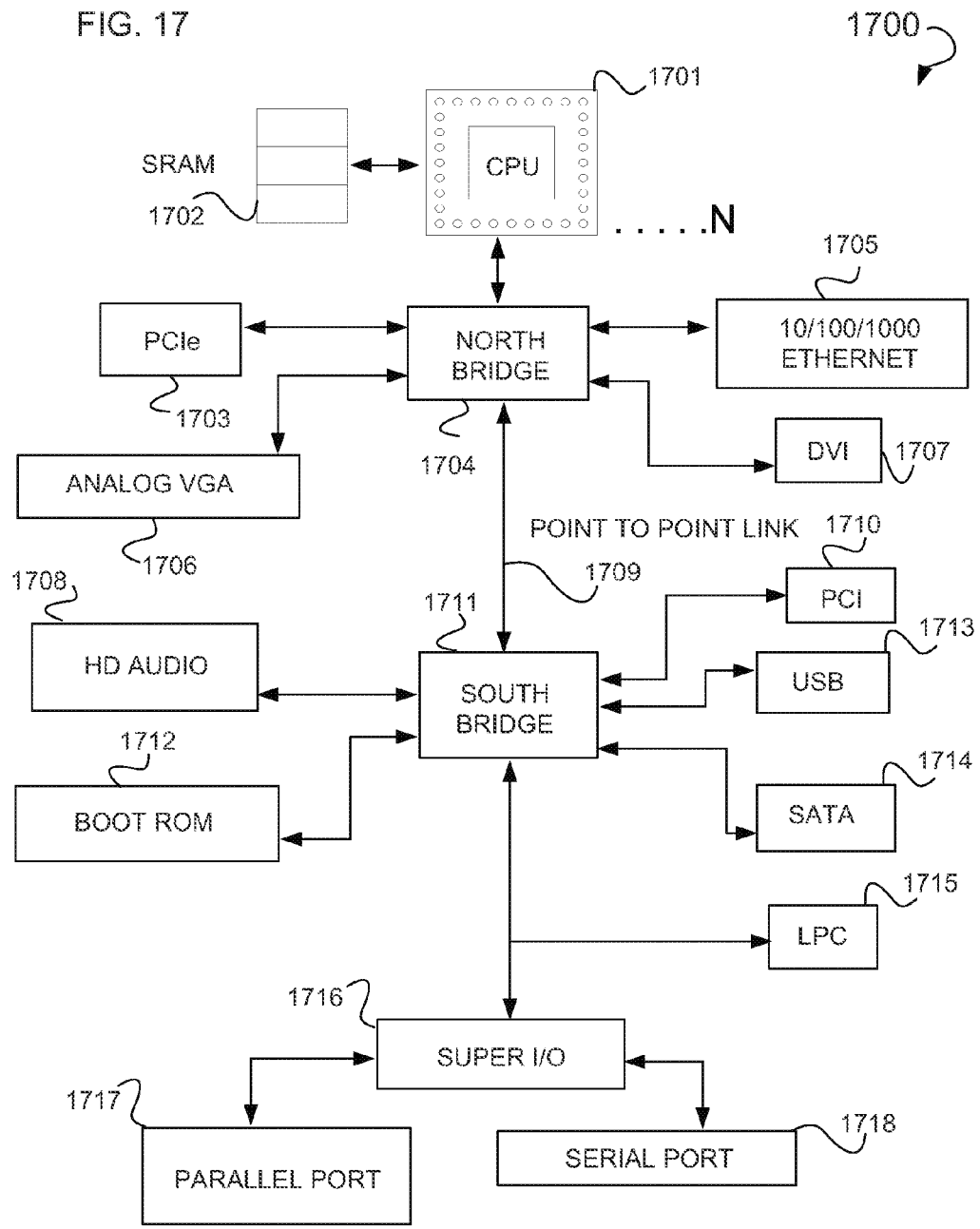
FIG. 17 is a diagram of an example computer system.

FIG. 17 is a diagram of an example computer system 1700. Shown is a CPU 1701. The processor die 201 may be a CPU 1701. In some example embodiments, a plurality of CPU may be implemented on the computer system 1700 in the form of a plurality of core (e.g., a multi-core computer system), or in some other suitable configuration. Some example CPUs include the x86 series CPU. Operatively connected to the CPU 1701 is Static Random Access Memory (SRAM) 1702. Operatively connected includes a physical or logical connection such as, for example, a point to point connection, an optical connection, a bus connection or some other suitable connection. A North Bridge 1704 is shown, also known as a Memory Controller Hub (MCH), or an Integrated Memory Controller (IMC), that handles communication between the CPU and PCIe, Dynamic Random Access Memory (DRAM), and the South Bridge. An ethernet port 1705 is shown that is operatively connected to the North Bridge 1704. A Digital Visual Interface (DVI) port 1707 is shown that is operatively connected to the North Bridge 1704. Additionally, an analog Video Graphics Array (VGA) port 1706 is shown that is operatively connected to the North Bridge 1704. Connecting the North Bridge 1704 and the South Bridge 1711 is a point to point link 1709. In some example embodiments, the point to point link 1709 is replaced with one of the above referenced physical or logical connections. A South Bridge 1711, also known as an I/O Controller Hub (ICH) or a Platform Controller Hub (PCH), is also illustrated. A PCIe port 1703 is shown that provides a computer expansion port for connection to graphics cards and related. GPUs. Operatively connected to the South Bridge 1711 are a High Definition (HD) audio port 1708, boot RAM port 1712, PCI port 1710, Universal Serial Bus (USB) port 1713, a port for a Serial Advanced Technology Attachment (SATA) 1714, and a port for a Low Pin Count (LPC) bus 1715. Operatively connected to the South Bridge 1711 is a Super Input/Output (I/O) controller 1716 to provide an interface for low-bandwidth devices (e.g., keyboard, mouse, serial ports, parallel ports, disk controllers). Operatively connected, to the Super I/O controller 1716 is a parallel port 1717, and a serial port 1718.

The SATA port 1714 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 1702 and/or within the CPU 1701 during execution thereof by the computer system 1700. The instructions may further be transmitted or received over the 10/100/1000 ethernet port 1705, USB port 1713 or some other suitable port illustrated herein.

In some example embodiments, a removable physical storage medium is shown to be a single medium, and the term "machine-readable medium" should be taken to include a single medium or multiple medium (e.g., a centralized or distributed database, and/or related caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

In some example embodiments, the methods illustrated herein may be implemented as instructions stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations there from. It is intended that the appended claims cover such modifications and variations as fall within the "true" spirit and scope of the invention.

What is claimed is:

1. A system comprising:
   a memory, that resides on a secured apparatus, which includes data stored as at least one entry of encoded information in a list;
   a Bloom filter generation module, that resides on the secured apparatus, to build a Bloom filter based upon the at least one entry, the Bloom filter to include at least one index position value that is set based upon a hash of the at least one entry;
   a seed generation module, that resides on the secured apparatus, to generate seed data to be associated with the at least one entry of encoded information;
   an interface module, that resides on an unsecured apparatus, to receive a validation request that includes the at least one entry of encoded information; and
   a Bloom filter module, that resides on the unsecured apparatus, to validate the associated seed data and the at least one entry of encoded information against the Bloom filter.

2. The system of claim 1, wherein the unsecured apparatus is located remotely from the secured apparatus.

3. The system of claim 2, wherein the seed generation module generates different seed data to be associated with the at least one entry and an additional entry of encoded information in the list each time a different Bloom filter is generated.

4. The system of claim 2, wherein the seed generation module generates seed data to be associated with the at least one entry, and different additional seed data to be associated with an additional entry in the list, each time a different Bloom filter is generated.

5. The system of claim 2, wherein the Bloom fitter generation module builds a different Bloom filter based upon a portion of the at least one entry.

6. The system of claim 2, wherein the Bloom filter generation module builds a different Bloom filter, through the use of a different set of hash functions, each time a different Bloom filter is generated by the Bloom filter generation module.

7. An unsecured apparatus comprising:
an interface module to receive a validation request, from a secured apparatus, the validation request to include data as encoded information;
a Bloom filter module to generate a hash of the encoded information where the encoded information is passed to a hash function that resides as part of the Bloom filter module; and
a processor to validate the encoded information through computing an index from the hash and testing a value stored at an index position in a Bloom filter.

8. The unsecured apparatus of claim 7, wherein the interface module transmits an invalidation result, the invalidation result transmitted where the hash maps to the index position value that denotes an invalid value.

9. The unsecured apparatus of claim 7, further comprising a seed module to store seed data to be associated with the encoded information.

10. The unsecured apparatus of claim 7, further comprising a seed module to store seed data to be associated with the Bloom filter each time a different Bloom filter is generated.

11. The unsecured apparatus of claim 10, wherein the seed data includes at least one of a bit value, an integer value, or an alpha-numeric value.

12. The unsecured apparatus of claim 7, wherein the Bloom filter module uses a different hash function each time an additional Bloom filter is received by the unsecured apparatus.

13. A computer implemented method comprising:
identifying data stored as an entry in a list;
truncating the entry to create a truncated entry;
transforming the truncated entry into a hash, the hash used to set an index position value within a Bloom filter; and
transmitting the Bloom filter to a server, wherein the server uses the Bloom filter to process validation requests.

14. The computer implemented method of claim 13, further comprising transforming the truncated entry into a different hash, the different hash used to set a different index position value within the Bloom filter.

15. The computer implemented method of claim 13, further comprising:
associating seed data and the truncated entry; and
transforming the associated seed data and truncated entry into a different hash, the different hash used to set a different index position value within a different Bloom filter.

* * * * *